United States Patent
Chen et al.

(10) Patent No.: US 9,833,957 B2
(45) Date of Patent: Dec. 5, 2017

(54) NON-GLUED LAMINATED BALL AND MANUFACTURING METHOD THEREOF

(71) Applicant: TongCheng HuiLong Sports articles Co.Ltd., Xianning, Hubei (CN)

(72) Inventors: Feng Chen, Hubei (CN); Yadong Lu, Hubei (CN)

(73) Assignee: TongCheng HuiLong Sports articles Co. Ltd., Xianning, Hubei (CN)

( * ) Notice: Subject to any disclaimer, the term of this patent is extended or adjusted under 35 U.S.C. 154(b) by 64 days.

(21) Appl. No.: 14/843,533

(22) Filed: Sep. 2, 2015

(65) Prior Publication Data
US 2015/0367182 A1    Dec. 24, 2015

(30) Foreign Application Priority Data
Jun. 11, 2015    (CN) .......................... 2015 1 0318683

(51) Int. Cl.
| | |
|---|---|
| *B29D 22/04* | (2006.01) |
| *B29D 22/02* | (2006.01) |
| *A63B 45/00* | (2006.01) |
| *A63B 41/10* | (2006.01) |
| *A63B 43/00* | (2006.01) |
| *B29K 21/00* | (2006.01) |

(52) U.S. Cl.
CPC .............. *B29D 22/02* (2013.01); *A63B 41/10* (2013.01); *A63B 43/005* (2013.01); *A63B 45/00* (2013.01); *B29D 22/04* (2013.01); *A63B 2243/007* (2013.01); *A63B 2243/0037* (2013.01); *B29K 2021/00* (2013.01)

(58) Field of Classification Search
CPC ....... A63B 41/10; A63B 13/005; A63B 45/00; B29D 22/02; B29D 22/04
See application file for complete search history.

(56) References Cited

U.S. PATENT DOCUMENTS 6,503,162 B1 *  1/2003  Shishido ................ A63B 41/08
                                                      473/599

FOREIGN PATENT DOCUMENTS

CN          101773723 A  *  7/2010

OTHER PUBLICATIONS

Machine Translation of Chinese Patent 101773723, Date Unknown.*

* cited by examiner

*Primary Examiner* — Jeff Aftergut (57) ABSTRACT

A non-glued laminated ball includes an inner bladder, a yarn layer, a rubber layer and an outer cover layer. The yarn layer sticks to an outer surface of the inner bladder. The rubber layer is provided between the yarn layer and the outer cover layer. The outer cover layer includes a plurality of outer covers. Stalk lines are provided among the outer covers. Bottom layers of the outer covers are required to be loose. The outer covers bond to a rubber raw material of the rubber layer through a mold-closing pressurization bonding. Then, through vulcanizing, the rubber raw material permeates into the yarn layer and the loose bottom layers of the outer covers for integrating the inner bladder, the yarn layer, the rubber layer and the outer cover layer together. No glue, industrial gasoline or methylbenzene is provided between the outer cover layer and the rubber layer.

7 Claims, 5 Drawing Sheets

NON-GLUED LAMINATED BALL AND MANUFACTURING METHOD THEREOF

CROSS REFERENCE OF RELATED APPLICATION

The present invention claims priority under 35 U.S.C. 119(a-d) to CN 201510318683.X, filed Jun. 11, 2015.

BACKGROUND OF THE PRESENT INVENTION

Field of Invention

The present invention relates to a technical field of sports goods, and more particularly to a non-glued laminated ball and a manufacturing method thereof.

Description of Related Arts

The conventional manufacturing method of the laminated ball mainly adopts the glue for bonding, so as to guarantee that the laminated ball is seamless. However, the glue changes qualitatively under a certain environment and it is difficult to avoid the crack of the laminated ball. Moreover, the glue leads to an environmental pollution.

In order to solve the above problems, the Chinese patent publication of CN101773723A disclosed the manufacturing method of the non-glued seamless vulcanized laminated ball, comprising steps of:

(1) upwardly expanding the bottom layer of the synthetic leather; brushing the first rubber material with the industrial gasoline or the methylbenzene; bonding the first rubber material to the bottom layer of the synthetic leather; and firmly pressing for tightly bonding the first rubber material to the synthetic leather;

(2) cutting the synthesized leather bonding to the first rubber material, obtained by the step (1), into the leather pieces by the leather tailoring device;

(3) winding the yarn around the surface of the inner bladder to form the inner yarn bladder;

(4) cutting the second rubber material to obtain the ball stalk having the desired width by the leather tailoring device;

(5) placing the leather pieces obtained by the step (2) and the ball stalk obtained by the step (4) into the suction mold having the notch groove, and bonding the leather pieces and the ball stalk to the inner surface of the suction mold through the vacuum absorption, wherein a small amount of the industrial gasoline or the methylbenzene is brushed on the first rubber material which is at the bottom of the leather pieces;

(6) placing the inner yarn bladder obtained by the step (3) into the suction mold; intercommunicating with the air-filling hole of the suction mold by the ball nozzle of the inner yarn bladder; filling air into the inner yarn bladder after closing the suction mold; and, bonding the inner yarn bladder to the synthetic leather which the first rubber material bonds to and the ball stalk through the pressurization to form the raw laminated ball;

(7) bonding the trademark to the inner wall of the heating vulcanization mold having the corresponding convex stalk lines; placing the raw laminated ball obtained by the step (6) into the heating vulcanization mold; intercommunicating with the air-filling hole of the heating vulcanization mold by the ball nozzle of the raw laminated ball; and, after closing the heating vulcanization mold, filling air into the raw laminated ball at the pressure of 3-5 kg/cm$^2$, so as to obtain the vulcanized laminated ball; and (8) shaping the vulcanized laminated ball obtained by the step (7) after moving out of the heating vulcanization mold, so as to obtain the non-glued seamless vulcanized laminated ball.

The above conventional manufacturing method, provided by the Chinese patent publication of CN101773723A, avoids the usage of the glue for bonding the synthetic leather to the first rubber material of the laminated ball to a certain extent. Moreover, the manufacturing method, provided by the Chinese patent publication of CN101773723A, reduces the glue waste, the environmental pollution and the labor force waste which is common in the conventional manufacturing method of the laminated ball. However, in the step (1) of the manufacturing method, the first rubber material bonds to the synthetic leather through brushing the first rubber material with the industrial gasoline or the methylbenzene. The industrial gasoline is the common name of the gasoline for the industrial use. The industrial gasoline is divided into the industrial solvent gasoline, the extraction solvent gasoline and the rubber industry solvent gasoline. The industrial gasoline has the following characteristics.

(1) Inflammability

The industrial gasoline is the inflammable liquid with the low flashing point. The industrial gasoline is liable to volatilize into the oil gas. When the oil gas concentration in the air is between the lower limit and the upper limit of the explosion, once the oil gas is exposed to the spark, the explosion happens, and thus safety measures are required for strictly preventing the fire and the explosion.

(2) Electrical Conductivity

The industrial gasoline has the low electrical conductivity and generates the static which hardly disperses. The industrial gasoline shakes or flows in the pipe during the transit. The static generated by the friction is accumulated to the dangerous extent. Thus, the static eliminating device is required before pumping, filling and pouring the industrial gasoline, such as grounding and connecting the two tanks containing the industrial gasoline with the electric wire, so as to eliminate the static, balance the potential and avoid the electrostatic spark.

(3) Toxicity

The long-term contact with the industrial gasoline by the skin leads to the degreasing of the skin and the skin inflammation. When people inhale the large amount of the solvent oil gas, the human physiological tissues, such as the nervous system, the respiratory system, the liver, the kidney and the hematopoietic system, are influenced at different degrees.

The methylbenzene is the colorless clear liquid, having the following risks.

(1) Health Risk

The methylbenzene is irritant to the skin and the mucosa and has the anesthetic effect on the central nervous system.

(2) Acute Intoxication

If people inhale the methylbenzene having the high concentration within a short time, the obvious irritative symptoms of the eyes and the upper respiratory tract, the conjunctiva congestion and the pharyngeal congestion, the dizziness, the headache, the nausea, the emesis, the chest distress, the limbs weakness, the unsteady gait and the clouding of the consciousness may occur. More seriously, the dysphoria, the convulsion and the coma occur.

(3) Chronic Intoxication

The long-term contact with the methylbenzene can cause the neurasthenic syndrome, the hepatomegaly, the menoxenia, the dry skin, the rhagadia and the dermatitis.

(4) Environmental Risk

The methylbenzene seriously harms the environment and pollutes the air, the water environment and the water source.

(5) Explosion Risk

The methylbenzene is inflammable and irritant.

Thus, adopting the industrial gasoline or the methylbenzene as the bonding agent of the rubber raw material and the synthetic leather leads to the environmental pollution, the serious harm to the human health and the potential safety risks.

SUMMARY OF THE PRESENT INVENTION

Accordingly, in order to solve the problems of the conventional manufacturing method of the laminated ball, the present invention provides a non-glued laminated ball. The conventional laminated ball adopts glue, industrial gasoline or methylbenzene for bonding outer covers to a rubber raw material, leading to a waste of materials, an environmental pollution and harm to human health. The non-glued laminated ball provided by the present invention avoids the above problems.

In order to accomplish the above objects, the present invention provides a non-glued laminated ball, comprising an inner bladder, a yarn layer, a rubber layer and an outer cover layer, wherein:

the yarn layer sticks to an outer surface of the inner bladder;

the rubber layer is provided between the yarn layer and the outer cover layer;

the outer cover layer comprises a plurality of outer covers, wherein stalk lines are provided among the plurality of the outer covers; and a bottom layer of each outer cover is required to be loose;

the outer covers bond to a rubber raw material of the rubber layer through a mold-closing pressurization bonding; and then, through a vulcanization, the rubber raw material permeates into the yarn layer and the loose bottom layers of the outer covers, in such a manner that the inner bladder, the yarn layer, the rubber layer and the outer cover layer are integrated together, so as to avoid a usage of glue, industrial gasoline and methylbenzene between the outer cover layer and the rubber layer.

Preferably, each stalk line has textures thereon.

Preferably, the textures are dot-shaped, W-shaped or S-shaped.

The present invention further provides a manufacturing method of the non-glued laminated ball, comprising steps of:

(1) filling air into an inner bladder to a required roundness and winding a yarn around an outer surface of the inner bladder by a yarn winding device to form a yarn ball;

(2) bonding a rubber raw material to an inner surface of a middle bladder bonding mold; placing the yarn ball into the middle bladder bonding mold; intercommunicating with an air-filling pipe of the middle bladder bonding mold by a nozzle of the yarn ball, and then processing the rubber raw material and the yarn ball with a mold-closing pressurization bonding at a pressure of 1-15 kg/cm$^2$; and then, bonding the rubber raw material to an outer surface of the yarn ball through the mold-closing pressurization bonding, so as to obtain a raw middle bladder;

(3) cutting a leather material into a plurality of outer covers by a leather tailoring knife;

(4) bonding the outer covers, obtained by the step (3), to an inner surface of an outer cover bonding mold of a bonding device; placing the raw middle bladder into the outer cover bonding mold; intercommunicating with a nozzle of the raw middle bladder by an air pipe of the bonding device, and then processing the raw middle bladder and the outer covers with the mold-closing pressurization bonding at a pressure of 0.5-15 kg/cm$^2$; and then, bonding the outer covers to the rubber raw material of the raw middle bladder through the mold-closing pressurization bonding, so as to obtain a raw laminated ball;

(5) placing the raw laminated ball, obtained by the step (4), into a vulcanization mold of a vulcanization device; intercommunicating with a nozzle of the raw laminated ball by an air pipe of the vulcanization mold, and then vulcanizing at a temperature of 90-170° C. and at a pressure of 0.5-4.5 kg/cm$^2$ for 3-30 min; and then, permeating into the yarn and bottom layers of the outer covers by the rubber raw material after vulcanizing, so as to obtain a vulcanized laminated ball; and (6) placing the vulcanized laminated ball, obtained by the step (5), into a shaping device for a pressurization shaping at the pressure of 0.5-15 kg/cm$^2$ for 0.2-5 min, so as to obtain a non-glued laminated ball after the pressurization shaping.

Preferably, the inner surface of the middle bladder bonding mold has a plurality of first suction holes thereon, wherein the first suction holes are for filling compressed gas into the middle bladder bonding mold, so as to tightly bond the rubber raw material to the inner surface of the middle bladder bonding mold.

Preferably, first convex bars are provided on the inner surface of the outer cover bonding mold; the first convex bars divide the inner surface of the outer cover bonding mold into a plurality of outer cover areas; the inner surface of the outer cover bonding mold has a plurality of second suction holes thereon; and, the second suction holes are for filling the compressed gas into the outer cover bonding mold, so as to tightly bond the outer covers to the inner surface of the outer cover bonding mold.

Preferably, the plurality of the outer covers bond to the corresponding outer cover areas of the inner surface of the outer cover bonding mold; the outer covers bond to an outer surface of the raw middle bladder through the mold-closing pressurization bonding; and, first grooves corresponding to the first convex bars are formed between each two adjacent outer covers, namely that the first grooves are formed on an outer surface of the raw laminated ball.

Preferably, second convex bars are provided on an inner surface of the vulcanization mold; positions of the second convex bars of the vulcanization mold correspond to positions of the first convex bars of the outer cover bonding mold; the raw laminated ball is vulcanized within the vulcanization mold into the vulcanized laminated ball; second grooves having the same position with the first grooves of the raw laminated ball are formed on an outer surface of the vulcanized laminated ball; and stalk lines are formed at the second grooves.

Preferably, the second convex bars of the vulcanization mold have first textures thereon; and second textures, consistent with the first textures of the second convex bars of the vulcanization mold, are formed on the stalk lines of the outer surface of the vulcanized laminated ball.

Preferably, the first textures and the second textures are dot-shaped, W-shaped or S-shaped.

The present invention has following benefits.

Firstly, the outer covers and the rubber raw material are bonded through the mold-closing pressurization bonding. During the process of the mold-closing pressurization bonding, a certain pressure is exerted for fully squeezing the air out of bonded surfaces between the outer covers and the rubber raw material, in such a manner that the outer covers and the rubber raw material are completely bonded. According to the available theory, because molecules between two objects have a close connection, an interaction force and an inherent movement performance, when the two objects are squeezed and pressed against each other, the molecules between the two objects have a relative movement. Moreover, because of the interaction force between the molecules, the two objects are tightly bonded and hardly separated.

Secondly, the conventional manufacturing methods adopts the glue, the industrial gasoline or the methylbenzene for bonding the outer covers to the rubber raw material, leading to the waste of materials, the environmental pollution and the harm to the human health. The present invention avoids the above problems. The technical solutions of the present invention have simple operations and a compact structure, save raw materials and are environmental friendly.

Thirdly, the outer covers are made of synthetic leather or authentic leather. The synthetic leather or the authentic leather is able to resist a high temperature of 90-170° C. Because the bottom layer of the synthetic leather or the leather is loose, after vulcanizing the raw laminated ball which is placed into the vulcanization mold, the rubber raw material becomes soft and then has fluidity. Moreover, because the bottom layer of the synthetic leather or the leather is loose, the rubber raw material obtains a certain flowing space and a certain containing space, so as to guarantee the fluidity of the rubber raw material and an amount of the rubber raw material contained in the bottom layers of the outer covers. Accordingly, the rubber raw material fully permeates into the bottom layers of the outer covers for completely bonding the outer covers to the rubber raw material. The outer covers and the rubber raw material are firmly bonded into a compact structure, and prevented from falling off.

Fourthly, the second convex bars are provided on the inner surface of the vulcanization mold. The second convex bars have the first textures thereon. After vulcanizing, the second grooves which are consistent with the second convex bars are formed on the vulcanized laminated ball. The stalk lines are formed at the second grooves. The second textures, which are consistent with the first textures of the second convex bars, are formed on the stalk lines. The second textures of the stalk lines strengthen a friction force between the laminated ball and the hand and improve a gripping effect.

Fifthly, the manufacturing method of the non-glued laminated ball, provided by the present invention, avoids the redundant stalk lines and saves the raw materials. The rubber raw material completely bonds to the outer covers, after the mold-closing pressurization bonding and the vulcanization. Moreover, the rubber raw material fully permeates into the bottom layers of the outer covers, so as to avoid a disconnection of edges of the outer covers. The disconnection of the edges of the outer covers is common in the conventional manufacturing methods because of bonding by the glue. Thus, no redundant stalk line is required for sealing the edges, which simplifies the manufacturing method.

BRIEF DESCRIPTION OF THE DRAWINGS

The features of the present invention will become apparent from the accompanying drawings. One skilled in the art will understand that the embodiment of the present invention as shown in the drawings is exemplary only and not intended to be limiting.

1—inner bladder; 2—yarn layer; 3—rubber layer; and 4—outer cover layer.

DETAILED DESCRIPTION OF THE PREFERRED EMBODIMENT

The present invention is further illustrated with the accompanying drawings, but not for limiting the scope of the present invention.

Figure 1:
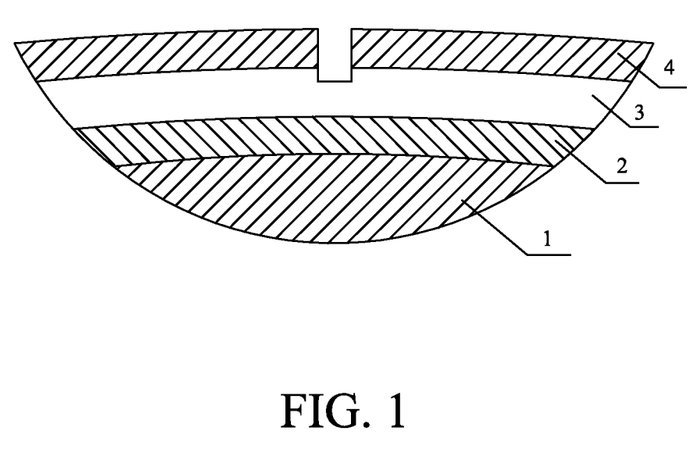
FIG. 1 is a structural sketch view of a non-glued laminated ball according to preferred embodiments of the present invention.

Referring to FIG. 1, the present invention provides a non-glued laminated ball, comprising an inner bladder 1, a yarn layer 2, a rubber layer 3 and an outer cover layer 4, wherein:

the yarn layer 2 sticks to an outer surface of the inner bladder 1;

the rubber layer 3 is provided between the yarn layer 2 and the outer cover layer 4;

the outer cover layer 4 comprises a plurality of outer covers, wherein stalk lines are provided among the plurality of the outer covers; and a bottom layer of each outer cover is required to be loose;

the outer covers bond to a rubber raw material of the rubber layer 3 through a mold-closing pressurization bonding; and then, through a vulcanization, the rubber raw material permeates into the yarn layer 2 and the loose bottom layers of the outer covers, in such a manner that the inner bladder 1, the yarn layer 2, the rubber layer 3 and the outer cover layer 4 are integrated together, so as to avoid a usage of glue, industrial gasoline and methylbenzene between the outer cover layer 4 and the rubber layer 3.

Figure 4:
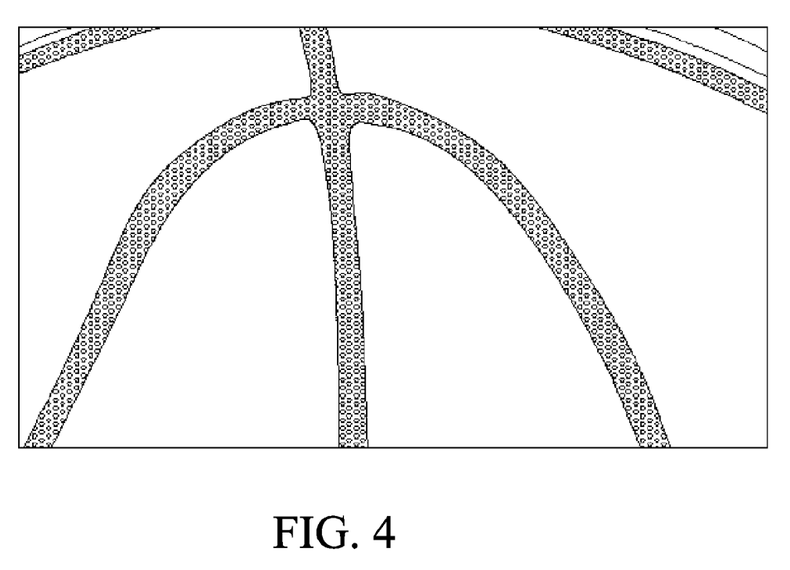
FIG. 4 is a partial sketch view of dot-shaped textures according to the preferred embodiments of the present invention.
Figure 5:
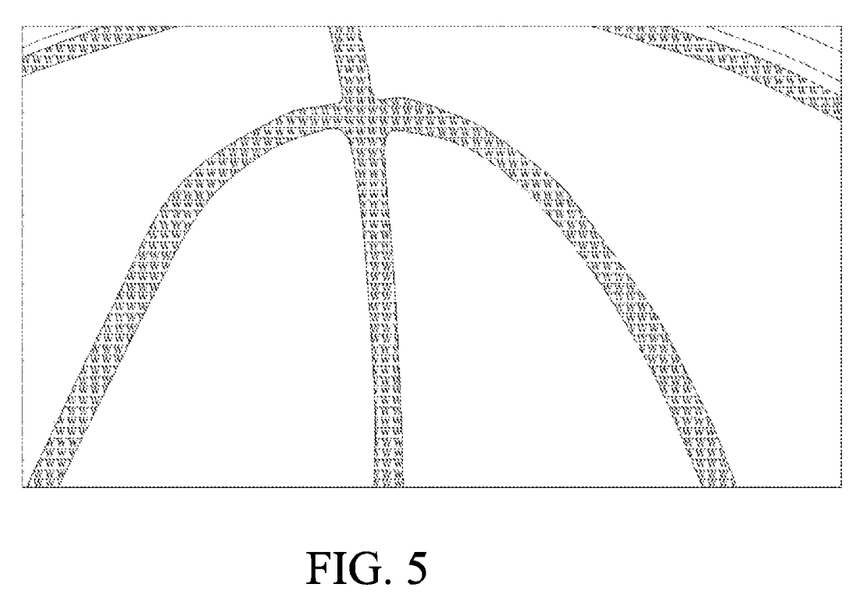
FIG. 5 is a partial sketch view of W-shaped textures according to the preferred embodiments of the present invention.
Figure 6:
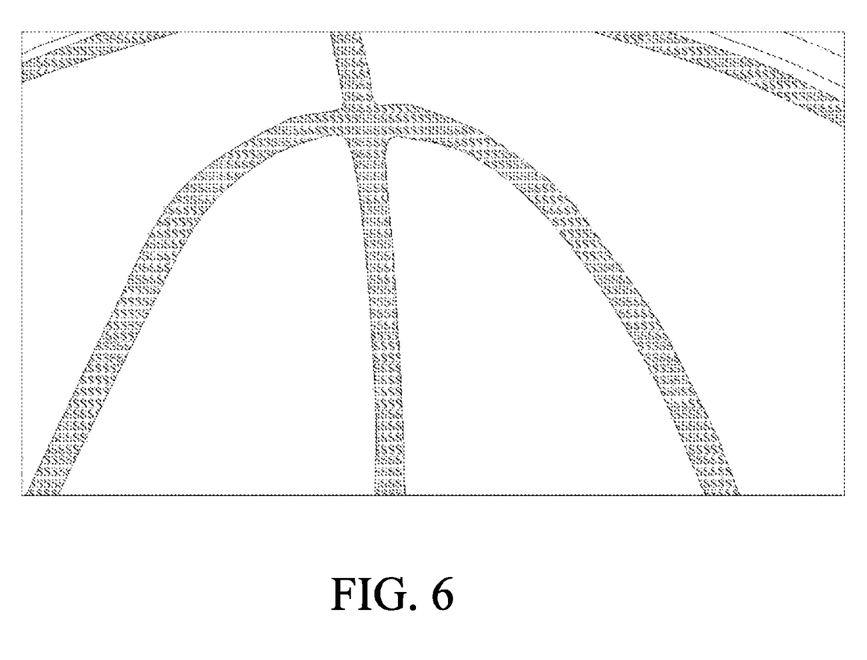
FIG. 6 is a partial sketch view of S-shaped textures according to the preferred embodiments of the present invention.

Further, each stalk line has textures thereon. The textures are dot-shaped, W-shaped or S-shaped, as showed in FIGS. 4-6. FIG. 4 shows the dot-shaped textures; FIG. 5 shows the W-shaped textures; and FIG. 6 shows the S-shaped textures. The textures are for strengthening a friction force between the non-glued laminated ball and a hand and improving a gripping effect. Alternatively, the textures can be smooth planes.

The present invention further provides a manufacturing method of the non-glued laminated ball, comprising steps of:

(1) filling air into an inner bladder 1 to a required roundness, and winding a yarn around an outer surface of the inner bladder 1 by a yarn winding device to form a yarn ball;

(2) bonding a rubber raw material to an inner surface of a middle bladder bonding mold; placing the yarn ball into the middle bladder bonding mold; intercommunicating with an air-filling suction pipe of the middle bladder bonding mold by a nozzle of the yarn ball, and processing the yarn ball and the rubber raw material with a mold-closing pressurization bonding at a pressure of 1-15 kg/cm²; and then, bonding the rubber raw material to the outer surface of the yarn ball through the mold-closing pressurization bonding, so as to obtain a raw middle bladder;

(3) cutting a leather material into a plurality of outer covers by a leather tailoring knife;

(4) bonding the outer covers, obtained by the step (3), to an inner surface of an outer cover bonding mold of a bonding device; placing the raw middle bladder into the outer cover bonding mold; intercommunicating with a nozzle of the raw middle bladder by an air pipe of the bonding device, and processing the raw middle bladder and the outer covers with the mold-closing pressurization bonding at a pressure of 0.5-15 kg/cm²; and then, bonding the outer covers to the rubber raw material of the raw middle bladder through the mold-closing pressurization bonding, so as to obtain a raw laminated ball;

(5) placing the raw laminated ball, obtained by the step (4), into a vulcanization mold of a vulcanization device; intercommunicating with a nozzle of the raw laminated ball by an air pipe of the vulcanization mold, and then vulcanizing, at a temperature of 90-170° C. and at a pressure of 0.5-4.5 kg/cm² for 3-30 min; and then, permeating into the yarn and bottom layers of the outer covers by the rubber raw material after vulcanizing, so as to obtain a vulcanized laminated ball; and (6) placing the vulcanized laminated ball, obtained by the step (5), into a shaping device for a pressurization shaping at the pressure of 0.5-15 kg/cm² for 0.2-5 min, so as to obtain a non-glued laminated ball after the pressurization shaping.

The inner surface of the middle bladder bonding mold has a plurality of first suction holes thereon. The first suction holes are for filling compressed gas into the middle bladder bonding mold, so as to tightly bond the rubber raw material to the inner surface of the middle bladder bonding mold. First convex bars are provided on the inner surface of the outer cover bonding mold. The first convex bars divide the inner surface of the outer cover bonding mold into a plurality of outer cover areas. The inner surface of the outer cover bonding mold has a plurality of second suction holes thereon. Further, the outer covers respectively bond to the corresponding outer cover areas of the inner surface of the outer cover bonding mold. The outer covers bond to an outer surface of the raw middle bladder through the mold-closing pressurization bonding. First grooves corresponding to the first convex bars are formed between each two adjacent outer covers, namely that the first grooves are formed on an outer surface of the raw laminated ball.

Further, second convex bars are provided on an inner surface of the vulcanization mold. Positions of the second convex bars of the vulcanization mold correspond to positions of the first convex bars of the outer cover bonding mold. The raw laminated ball is vulcanized within the vulcanization mold into the vulcanized laminated ball. Second grooves having the same position with the first grooves of the raw laminated ball are formed on an outer surface of the vulcanized laminated ball. Stalk lines are formed at the second grooves. The second convex bars of the vulcanization mold have first textures thereon; and second textures, consistent with the first textures of the second convex bars of the vulcanization mold, are formed on the stalk lines of the outer surface of the vulcanized laminated ball. The first textures and the second textures are dot-shaped, W-shaped or S-shaped, as showed in FIGS. 4-6. FIG. 4 shows the dot-shaped textures; FIG. 5 shows the W-shaped textures; and FIG. 6 shows the S-shaped textures. The textures are for strengthening a friction force between the non-glued laminated ball and a hand and improving a gripping effect.

According to the manufacturing method of the non-glued laminated ball of the present invention, the rubber raw material bonds to the outer surface of the yarn ball through the mold-closing pressurization bonding; and the outer covers bond to the outer surface of the raw middle bladder through the mold-closing pressurization bonding. The outer covers bond to the outer surface of the raw middle bladder without the usage of the glue, the industrial gasoline or the methylbenzene. However, the conventional method adopts the glue, the industrial gasoline or the methylbenzene for bonding the outer covers to the rubber raw material, causing a waste of materials, an environmental pollution and harm to human health. The manufacturing method provided by the present invention avoids the above problems. Moreover, the manufacturing method provided by the present invention leads to a compact and firm structure of the laminated ball; the present invention avoids a disconnection of the outer covers and degumming and provides the non-glued laminated ball more durable, compared to the conventional method.

The leather material is made of synthetic leather or authentic leather. The synthetic leather or the authentic leather is required to resist a high temperature of 90-170° C.; and a bottom layer of the synthetic leather or the authentic leather is required to be loose. Because the leather material is required to be vulcanized at the temperature of 90-170° C. and at the pressure of 0.5-4.5 kg/cm², the synthetic leather or the authentic leather is required to resist the high temperature of 90-170° C. Moreover, when being vulcanized at the temperature of 90-170° C., the rubber raw material is required to have a good fluidity. When choosing the leather material, the bottom layer of the synthetic leather or the leather is required to be loose. Accordingly, when the rubber raw material permeates into the bottom layers of the outer covers, a certain flowing space and a certain containing space of the rubber raw material is guaranteed to fully bond the rubber raw material to the bottom layers of the outer covers. At the pressure of 0.5-4.5 kg/cm², a flexibility of the synthetic leather or the authentic leather is protected from damage, which guarantees a touching effect of the synthetic leather or the authentic leather. Moreover, at the pressure of 0.5-4.5 kg/cm², flowing of the rubber raw material is accelerated, so that the rubber raw material rapidly permeates into the bottom layers of the outer covers and the yarn. After being vulcanized, the outer covers, the rubber raw material, the yarn and the inner bladder 1 are fully bonded and integrated into the compact and firm structure.

First Preferred Embodiment

Figure 2:
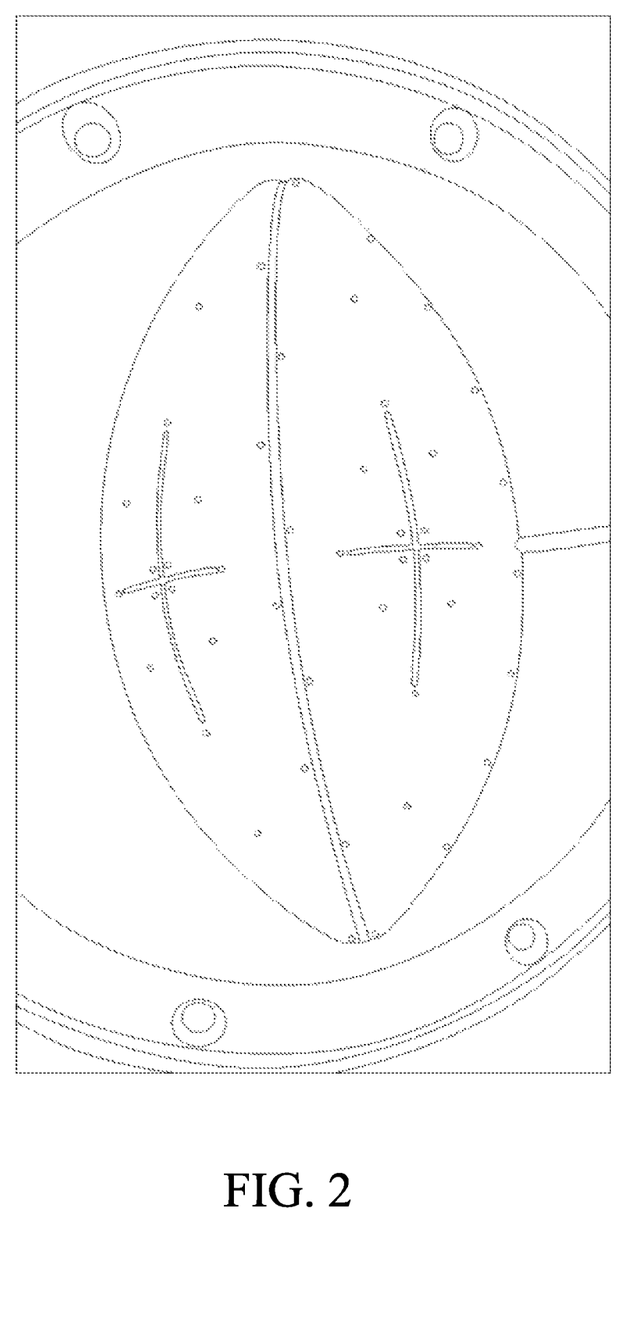
FIG. 2 is a structural sketch view of an outer cover bonding mold according to a first preferred embodiment of the present invention.

According to the first preferred embodiment of the present invention, the non-glued laminated ball is a rugby football, as showed in FIG. 2. Convex bars are provided on an inner surface of the outer cover bonding mold. The convex bars divide the inner surface of the outer cover bonding mold into a plurality of outer cover areas. The inner surface of the outer cover bonding mold has a plurality of suction holes thereon. The suction holes guarantee that outer covers tightly bond to the inner surface of the outer cover bonding mold.

Second Preferred Embodiment

Figure 3:
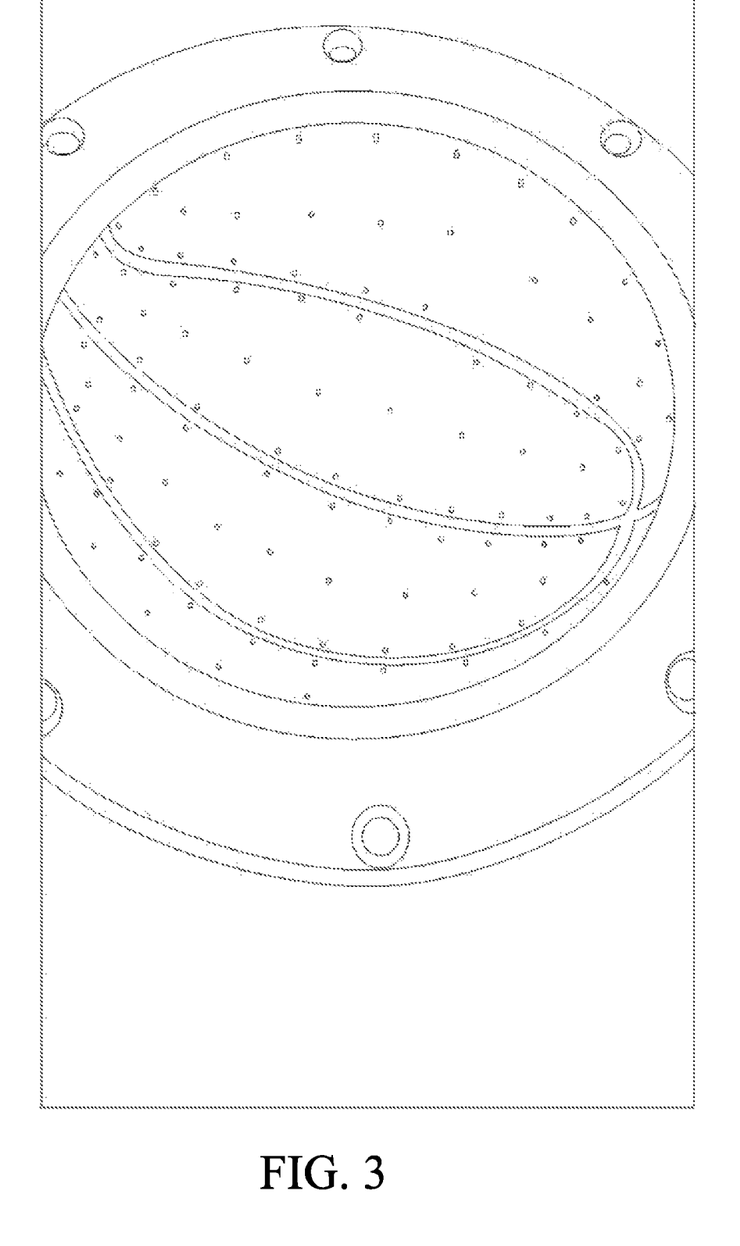
FIG. 3 is a structural sketch view of the outer cover bonding mold according to a second preferred embodiment of the present invention.

According to the second preferred embodiment of the present invention, the non-glued laminated ball is a basketball, as showed in FIG. 3. Convex bars are provided on an inner surface of the outer cover bonding mold. The convex bars divide the inner surface of the outer cover bonding mold into a plurality of outer cover areas. The inner surface of the outer cover bonding mold has a plurality of suction holes thereon. The suction holes guarantee that outer covers tightly bond to the inner surface of the outer cover bonding mold.

According to the manufacturing method of the non-glued laminated ball provided by the present invention, the rubber raw material bonds to the outer surface of the yarn ball through the mold-closing pressurization bonding at a certain pressure; and the outer covers bond to the outer surface of the raw middle bladder through the mold-closing pressurization bonding at the certain pressure. During the mold-closing pressurization bonding, the pressure is exerted to guarantee that each two bonded surfaces are completely bonded. Under the pressure, the air between each two bonded surfaces is squeezed out, in such a manner that no gap or resistance exists between each two bonded surfaces. Because of an inherent molecule movement performance of an object, a molecule interaction force and a close connection among the molecules, two objects are completely bonded and hardly separated. In the conventional methods, the rubber raw material bond to the outer surface of the yarn ball without exerting the pressure, leading to the gap or the air existing between the bonded surfaces of the rubber raw material and the yarn ball. Accordingly, the rubber raw material fails to completely bond to the yarn ball, and the laminated ball lacks elasticity. Moreover, in the conventional methods, the outer covers bond to the rubber raw material through the glue, the industrial gasoline or the methylbenzene, which causes the waste of the materials, the environmental pollution, the disconnection of the outer covers and the degumming. The present invention overcomes the above problems in the conventional methods by bonding the rubber raw material to the outer surface of the yarn ball through the mold-closing pressurization bonding.

One skilled in the art will understand that the embodiment of the present invention as shown in the drawings and described above is exemplary only and not intended to be limiting. It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for manufacturing a non-glued laminated ball, comprising steps of:
   (1) filling air into an inner bladder to a required roundness, and winding a yarn around an outer surface of the inner bladder by a yarn winding device to form a yarn ball;
   (2) bonding a rubber raw material to an inner surface of a middle bladder bonding mold; placing the yarn ball into the middle bladder bonding mold; intercommunicating with an air-filling pipe of the middle bladder bonding mold by a nozzle of the yarn ball, and then processing the yarn ball and the rubber raw material with mold-closing pressurization bonding at a pressure of 1-15 kg/cm$^2$; and then, bonding the rubber raw material to an outer surface of the yarn ball through the mold-closing pressurization bonding, so as to obtain a raw middle bladder;
   (3) cutting a leather material into a plurality of outer covers by a leather tailoring knife;
   (4) bonding the outer covers, obtained by the step (3), to an inner surface of an outer cover bonding mold of a bonding device; placing the raw middle bladder into the outer cover bonding mold; intercommunicating with a nozzle of the raw middle bladder by an air pipe of the bonding device, and then processing the raw middle bladder and the outer covers with the mold-closing pressurization bonding at a pressure of 0.5-15 kg/cm$^2$; and then, bonding the outer covers to the rubber raw material of the raw middle bladder through the mold-closing pressurization bonding, so as to obtain a raw laminated ball;
   (5) placing the raw laminated ball, obtained by the step (4), into a vulcanization mold of a vulcanization device; intercommunicating with a nozzle of the raw laminated ball by an air pipe of the vulcanization mold, and then vulcanizing, at a temperature of 90-170° C. and at a pressure of 0.5-4.5 kg/cm$^2$ for 3-30 min; and then, permeating into the yarn and bottom layers of the outer covers by the rubber raw material after vulcanizing, so as to obtain a vulcanized laminated ball; and
   (6) placing the vulcanized laminated ball, obtained by the step (5), into a shaping device for pressurization shaping at the pressure of 0.5-15 kg/cm$^2$ for 0.2-5 min, so as to obtain the non-glued laminated ball after the pressurization shaping.

2. The method for manufacturing the non-glued laminated ball, as recited in claim 1, wherein: the inner surface of the middle bladder bonding mold has a plurality of suction holes thereon; and the suction holes are for filling compressed gas into the middle bladder bonding mold, so as to tightly bond the rubber raw material to the inner surface of the middle bladder bonding mold.

3. The method for manufacturing the non-glued laminated ball, as recited in claim 1, wherein: first convex bars are provided on the inner surface of the outer cover bonding mold; the first convex bars divide the inner surface of the outer cover bonding mold into a plurality of outer cover areas; the inner surface of the outer cover bonding mold has a plurality of suction holes thereon; and the plurality of the suction holes are for filling compressed gas into the outer cover bonding mold, so as to tightly bond the outer covers to the inner surface of the outer cover bonding mold.

4. The method for manufacturing the non-glued laminated ball, as recited in claim 3, wherein: the plurality of the outer covers bond to the corresponding outer cover areas of the inner surface of the outer cover bonding mold; the outer covers bond to an outer surface of the raw middle bladder through the mold-closing pressurization bonding; and, first grooves corresponding to the first convex bars are formed between each two adjacent outer covers, namely that the first grooves are formed on an outer surface of the raw laminated ball.

5. The method for manufacturing the non-glued laminated ball, as recited in claim 4, wherein: second convex bars are provided on an inner surface of the vulcanization mold; positions of the second convex bars of the vulcanization mold correspond to positions of the first convex bars of the outer cover bonding mold; the raw laminated ball is vulcanized within the vulcanization mold into the vulcanized laminated ball; second grooves having the same position with the first grooves of the raw laminated ball are formed on an outer surface of the vulcanized laminated ball; and stalk lines are formed at the second grooves.

6. The method for manufacturing the non-glued laminated ball, as recited in claim 5, wherein: the second convex bars of the vulcanization mold have first textures thereon; and second textures, consistent with the first textures of the second convex bars, are formed on the stalk lines of the outer surface of the vulcanized laminated ball.

7. The method for manufacturing the non-glued laminated ball, as recited in claim 6, wherein: the first textures and the second textures are dot-shaped, W-shaped or S-shaped.

\* \* \* \* \*